Dec. 31, 1935.   J. A. JENSEN   2,026,501
TANK CONSTRUCTION
Filed Dec. 30, 1931   3 Sheets-Sheet 1
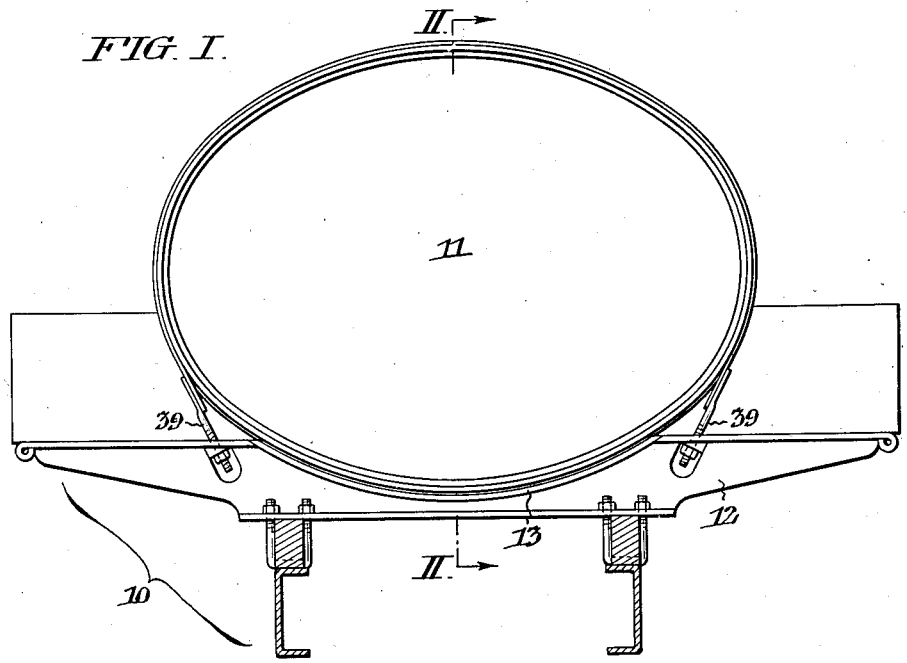
FIG. I.
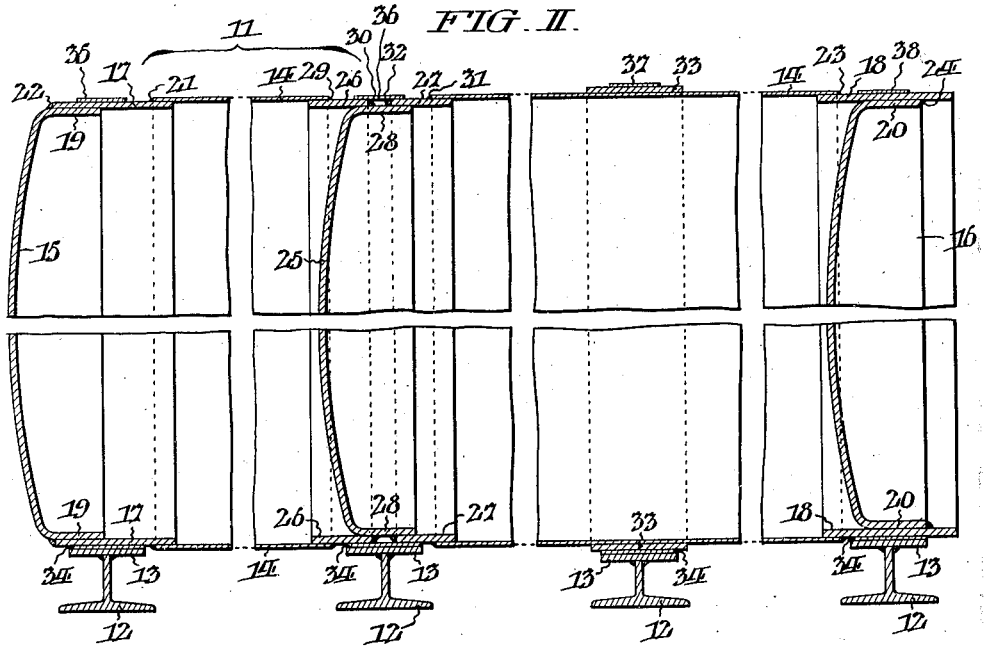
FIG. II.
WITNESSES:
John C. Bergner
John A. Weidler
INVENTOR:
James A. Jensen,
BY Fraley Paul
ATTORNEYS.

Dec. 31, 1935.  J. A. JENSEN  2,026,501
TANK CONSTRUCTION
Filed Dec. 30, 1931  3 Sheets-Sheet 2
FIG. III.
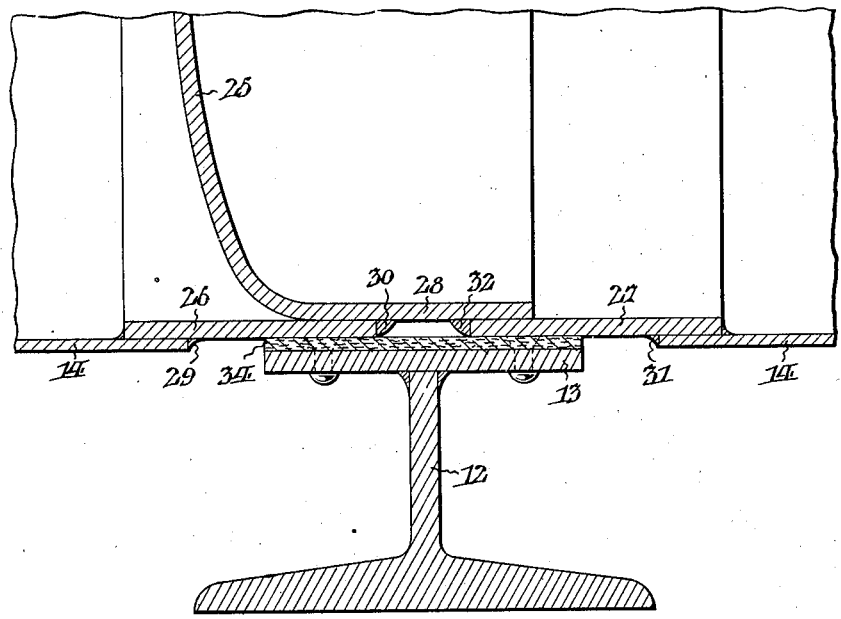
FIG. VI.
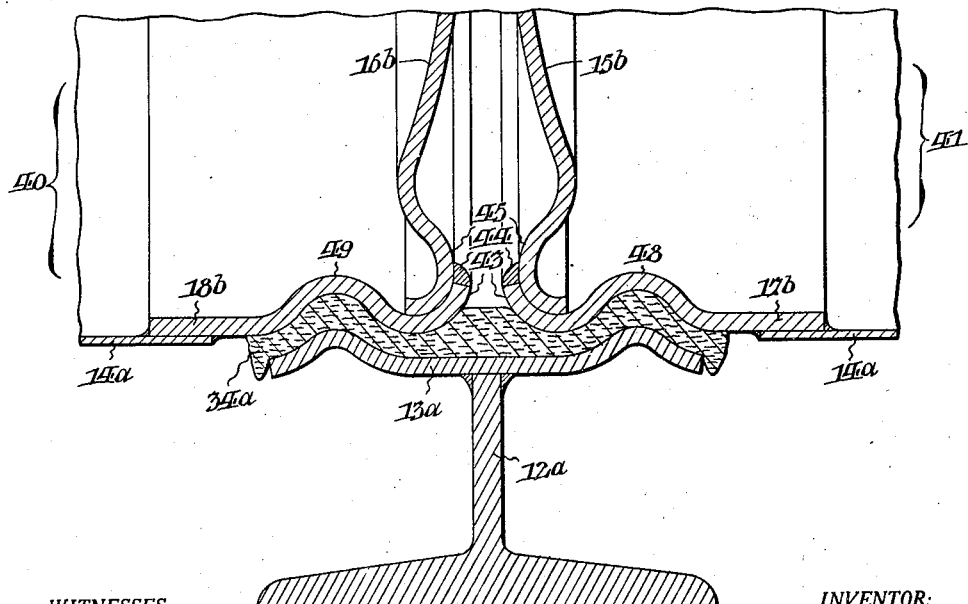
WITNESSES:
John C. Bergner.
John A. Weidler
INVENTOR:
James A. Jensen,
BY Frally Paul
ATTORNEYS.

Dec. 31, 1935.   J. A. JENSEN   2,026,501
TANK CONSTRUCTION
Filed Dec. 30, 1931   3 Sheets-Sheet 3
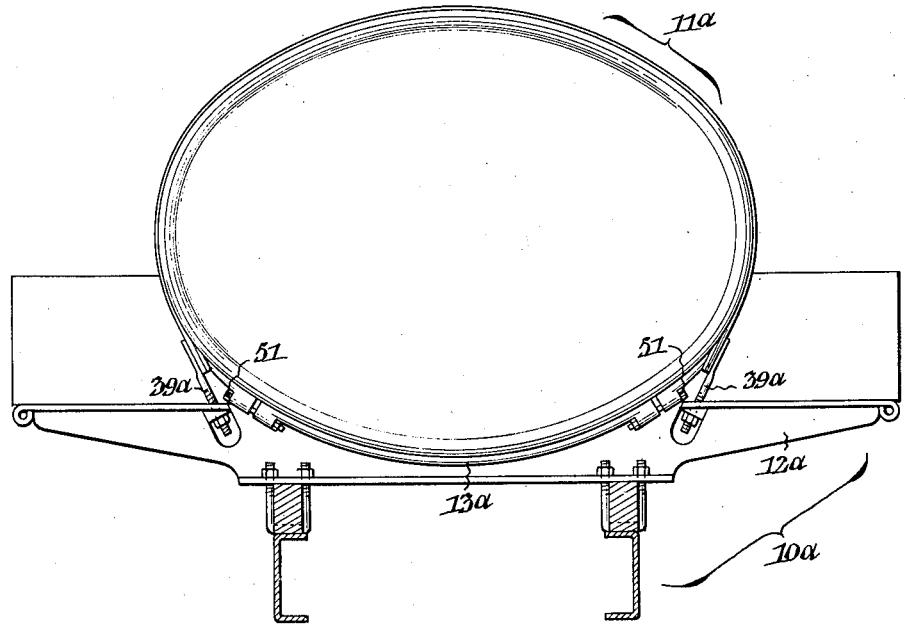
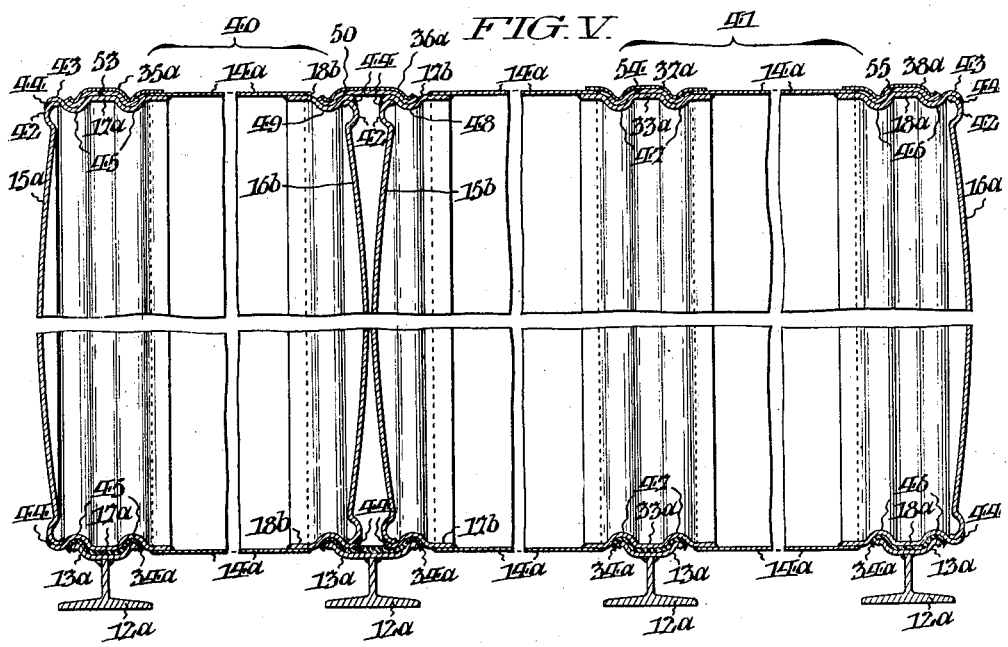

Patented Dec. 31, 1935

2,026,501

UNITED STATES PATENT OFFICE 2,026,501

TANK CONSTRUCTION

James A. Jensen, Philadelphia, Pa., assignor to Quaker City Iron Works, Philadelphia, Pa., a corporation of Pennsylvania Application December 30, 1931, Serial No. 583,935

4 Claims. (Cl. 220—5)

This invention relates to tanks; and it has more especial reference to tanks for vehicles used in the transportation of liquid commodities such as gasoline, fuel oils, lubricating oils, etc.

In order to withstand the strains induced by surging of the liquids incident to their transportation, as well as to be secure against distortion and rupture under constant pounding and vibration, tanks of the kind referred to must, of necessity be inherently strong; and it has accordingly been the practice heretofore to construct them from heavy gage sheet metal throughout. Such construction is however disadvantageous in that it is expensive from the standpoint of the material costs, and in that it renders the tanks excessively heavy.

My invention has for its chief aim to overcome the drawbacks to which attention has just been directed, which desideratum I attain, as hereinafter fully disclosed, by constructing the tanks for the most part from comparatively light sheet metal, and by employing reinforcing members of heavier gage metal at those regions which are directly subjected to the strains induced by liquid surging, jarrings and vibrations incident to travel of the vehicles, as well as at the regions of support and anchorage of the tanks on the chassis of the vehicles.

Other objects and attendant advantages will be manifest from the following detailed description considered in connection with the accompanying drawings, wherein Fig. I shows a partial cross sectional view of a gasoline delivery vehicle with a multi-compartment tank constructed in accordance with my invention.

Fig. II is a broken out view drawn to a larger scale, showing the tank in longitudinal section.

Fig. III is a fragmentary sectional view drawn to a still larger scale, showing important structural details at one of the intermediate points of support of the tank; and, Figs. IV, V, and VI are views corresponding to Figs. I, II and III showing my invention embodied in a multi-compartment tank made up from a number of separate smaller tank units.

Referring first generally to Figs. I, II, and III of these illustrations, the numeral 10 comprehensively designates the chassis of the vehicle; and the numeral 11 the tank with the construction of which my invention is more particularly concerned. The tank 11 is herein shown as being of elliptic cross sectional configuration, and as lying horizontally resting on one of its broader sides, it being supported adjacent its ends and at points intermediate its length, by beams or girts 12 extending transversely of the vehicle chassis 10. In accordance with standard and accepted practice, the girts 12 are made to I-cross section with arcuate upper flanges 13 curved to correspond with the cross sectional configuration of the tank 11. From Fig. II it will be observed that the tank 11 comprises a number of aligned shell sections 14 of comparatively light sheet metal, and circumferentially flanged end heads 15, 16 which are joined to the shell through interposition of annular juncture rings or bands 17 and 18 respectively formed from a heavier gage sheet metal. As shown, the reinforcing juncture bands 17 and 18 telescope into the ends of the shell sections 14, and over the circumferential flanges 19 and 20 respectively of said end heads. After assembling, the shell sections 14, the heads 15 and 16 and the reinforcing rings 17 and 18 are permanently united preferably by welding as conventionally indicated at 21, 22 and 23, 24 in Fig. II.

One of the bulk heads by which the tank is interiorly subdivided into separate compartments of different capacities is indicated at 25 in Figs. II and III, the said bulkhead being identical in size and configuration with the end heads 15 and 16. The bulkhead 25 is incorporated in the tank structure through interposition between it and the contiguous ends of adjacent tank sections 14, 14, of reinforcing juncture bands 26 and 27 which peripherally lap the circumferential flange 28 of said bulk head, and which telescope into the ends of said tank shell sections. Here again, welding is resorted to, as indicated conventionally at 29 and 30 and at 31 and 32, to secure the parts just referred to permanently together. The juncture rings 17 and 18 adequately reinforce the tank adjacent the ends where it rests on the outermost of the series of transverse girts 12 of the vehicle chassis 10; while the rings 26 and 27 serve in a like capacity at one of the intermediate points of support of the tank 11. At other points along the length of the tank 11 in line with others of the transverse girts 12 of the vehicle chassis 10, I provide girdling rings such as shown at 33 of the heavier gage metal. In order to compensate for irregularities in the tank and the flanges 13 of the transverse beams or girts 12 of the vehicle chassis 10, I interpose between them at each point of support, a cushioning 34 (Figs. II and III) of felt, rubber or like material.

As a means to secure the tank 11 in position on the chassis 10 of the vehicle, I employ, in the present instance, metallic hold-down or lashing straps 35, 36, 37, and 38 which embrace the reinforcing rings 17, 26—27, 33 and 18 respectively. As shown in Fig. I, the straps 35—38 are provided with screw bolt ends 39 which are suitably anchored in the transverse girts 12 and fitted with nuts whereby they may be drawn up tight.

Thus by employing a shell section or sections 14 of light sheet metal and reinforcing members of heavier gage sheet metal adjacent the end heads 15, 16, in the region of dividing bulkheads, and at other intermediate points along the length of the tank shell, I am able to provide a tank structure which is amply strong and sturdy to withstand strains which it may be called upon to resist in use, at a great saving in the cost of material with attendant elimination of excess weight.

In the organization delineated in Figs. IV, V and VI, the tank 11a is made up of a number of separate tank units whereof there are but two illustrated, the same being designated by the numerals 40 and 41. As shown, the smaller of the two units, numbered 40, comprises a single section shell 14a of light gage sheet metal, end-heads 15a, 16b, and interposed reinforcing juncture rings 17a and 18b. The larger of the two tank sections, designated by the numeral 41, comprises, on the other hand, two shell sections 14a of light gage sheet metal, end heads 15b and 16a, and interposed reinforcing juncture rings 17b, 18a, as well as an intermediate juncture ring 33a of heavy gage metal that joins the contiguous ends of the shell sections 14a, 14a of said larger unit. The end heads 15a, 16b and 15b, 16a of the two tank units 40 and 41 are in this instance respectively formed with rounded peripheral beads 42 over which the contiguous edges of the reinforcing rings 17a, 18b and 17b, 18a are rolled as at 43 and welded fast as at 44. The reinforcing juncture rings 17a, 18a and 33a are each further formed with closely adjacent pairs of circumferential grooves or recesses 45, 46 and 47; while the reinforcing rings 17b and 18b are respectively formed with single circumferential recesses 48 and 49. As in the first described embodiment of my invention, the transverse beams or girths 12a of the vehicle chassis 10a are of channel cross section with arcuate upper flanges 13a that conform to the curvature of the tank 11a. In this case, however, the flanges 13a are shaped to respectively fit the circumferential recesses 45, 46, 47 and 48, 49 of the reinforcing rings 17a, 18a, 33a and 17b, 18b respectively. The contiguous ends of the aligned tank sections 40 and 41 are secured together and to the corresponding cross beam or girt 12a of the chassis 10a by a clamp strap 50, which, in effect, constitutes a continuation of the flange 13a of the girt whereto it is secured, end for end, by draw-bolts shown at 51 in Fig. IV. Similar straps 53, 54, and 55 serve to fasten the tank 11a to the other girts 12a; and for greater security at the several points of support, hold-down straps 35a, 36a, 37a and 38a are employed, these being in turn conformative with the straps 53, 50, 54 and 55, and, like the lashing straps 35, 36, 37, and 38 of the first described embodiment, provided with screw bolt ends 39a for anchorage in the ends of the said girts. The cushioning shown at 34a in Figs. V and VI serves in a capacity similar to that hereinbefore described of the cushioning at 34 in Figs. II and III. By virtue of interfitment of the parts at the regions of support, it is evident that the composite tank of Figs. IV, V, and VI is firmly secured against the possibility of shifting endwise on the vehicle chassis 11a.

Having thus described my invention, I claim:

1. A tank for liquid transporting vehicles comprising a tubular sectional-body shell of light gage sheet metal, circumferentially-flanged end-heads, and reinforcing juncture bands of heavier gage sheet metal engaging exteriorly of the end-head flanges and interiorly of the tubular body sections with similar rings at the sectional juncture points, said bands permanently-uniting the shell sections and end-heads into an integral structure.

2. A tank for liquid transporting vehicles, adapted to be horizontally supported at intermediate points as well as adjacent its ends by the vehicle chassis, comprising a tubular sectional-body shell of light gage sheet metal, flat reinforcing girdling-bands of heavier gage sheet metal immovably-fixed to the body shell sections between their ends at the regions of intermediate support, circumferentially-flanged end heads with corresponding bulkheads at the tank sectional points, and interfitted annular flat bands, likewise of the heavier gage sheet metal, engaged exteriorly over the end head and bulkhead flanges and interiorly of the tubular body sections at their termini, said annular bands permanently-uniting the shell sections, end heads and bulkheads, into an integral structure.

3. A tank for liquid transporting vehicles, adapted to be horizontally supported at intermediate points as well as at its ends by the vehicle chassis, comprising a tubular sectional-body shell of light gage sheet metal, reinforcing flat girdling-bands of heavier gage sheet metal immovably-fixed to the body shell sections between their ends at the regions of intermediate support, circumferentially-flanged end heads with corresponding bulk heads at the tank sectional-junctures, interfitted annular flat bands, likewise of the heavier gage sheet metal, engaged exteriorly over the head and bulkhead flanges and interiorly of the tubular body sections at their ends, said annular bands permanently-uniting the shell sections, end heads and bulk-heads, into an integral structure, and hold-down straps embracing the annular reinforcing flat bands aforesaid whereby the tank is lashed to the vehicle chassis with assurance against endwise shifting.

4. The combination of claim 3 wherein the bulkheads are permanently connected with the body shell by pairs of spacedly-aligned annular flat bands of the heavier gage sheet material.

JAMES A. JENSEN.